US008254360B2

(12) United States Patent
Julian et al.

(10) Patent No.: US 8,254,360 B2
(45) Date of Patent: Aug. 28, 2012

(54) OFDMA CONTROL CHANNEL INTERLACING

(75) Inventors: David Jonathan Julian, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 11/447,378

(22) Filed: Jun. 5, 2006

(65) Prior Publication Data

US 2006/0285601 A1 Dec. 21, 2006

Related U.S. Application Data

(60) Provisional application No. 60/691,436, filed on Jun. 16, 2005.

(51) Int. Cl.
*H04J 1/00* (2006.01)
(52) U.S. Cl. ........ 370/343; 370/319; 370/337; 370/344; 455/450; 455/452.1
(58) Field of Classification Search .......... 370/310–350, 370/208; 375/146, 147; 455/452.1
See application file for complete search history.

(56) References Cited

U.S. PATENT DOCUMENTS

| | | | |
|---|---|---|---|
| 5,390,366 A | 2/1995 | Kasugai | |
| 6,134,200 A | 10/2000 | Timmermans | |
| 6,324,401 B1 | 11/2001 | De Hoz Garcia-Bellido et al. | |
| 6,628,631 B1 | 9/2003 | Mazawa et al. | |
| 6,633,554 B1 | 10/2003 | Dalal | |
| 6,636,735 B2 | 10/2003 | Mohebbi | |
| 6,725,043 B2 | 4/2004 | Bonta et al. | |
| 6,757,270 B1 | 6/2004 | Kumar | |
| 6,859,444 B1 | 2/2005 | Vancraeynest | |
| 6,973,308 B1 | 12/2005 | Smith | |
| 6,993,341 B2 | 1/2006 | Hunzinger | |
| 7,054,632 B2 | 5/2006 | Attar et al. | |
| 7,133,688 B2 | 11/2006 | Das et al. | |

(Continued)

FOREIGN PATENT DOCUMENTS

CN 1272756 11/2000

(Continued)

OTHER PUBLICATIONS

Beek et. al., A Time an Frequency synchronization Scheme for Multiuser OFDM, Nov. 1999, IEE Journal on Selected Areas in Communication, vol. 17 No. 11, pp. 1900-1914.*

(Continued)

*Primary Examiner* — Amancio Gonzalez
(74) *Attorney, Agent, or Firm* — Donald C. Kordich

(57) ABSTRACT

Apparatus and methods for interlacing communications in random access control channels of an Orthogonal Frequency Division Multiple Access (OFDMA) wireless communication system are described. A wireless communication device communicating over distinct OFDMA control channels to multiple serving sectors may operate under link limited conditions. The wireless communication device can interlace the communications between the multiple serving sectors. The wireless communication device can interlace the control channel communications in a number of interlaces equal to the number of distinct control channels over which communications are scheduled. In another embodiment, the wireless communication device divide the multiple scheduled control channel communications into two or more sets and can interlace the sets. In another embodiment, the wireless communication device can reserve a first interlace for control channel communications with the serving sector and can time multiplex the remaining control channel communications on a second interlace.

25 Claims, 7 Drawing Sheets

U.S. PATENT DOCUMENTS

| | | | |
|---|---|---|---|
| 7,190,964 B2 | 3/2007 | Damnjanovic et al. | |
| 7,397,839 B2* | 7/2008 | Maeda et al. | 375/141 |
| 7,684,778 B1 | 3/2010 | Qian et al. | |
| 2002/0085517 A1 | 7/2002 | Lee et al. | |
| 2002/0094834 A1 | 7/2002 | Baker et al. | |
| 2002/0138721 A1 | 9/2002 | Kwon et al. | |
| 2002/0196752 A1 | 12/2002 | Attar et al. | |
| 2003/0017831 A1 | 1/2003 | Lee et al. | |
| 2003/0064741 A1 | 4/2003 | Silva et al. | |
| 2003/0073455 A1 | 4/2003 | Hashem et al. | |
| 2003/0076796 A1 | 4/2003 | Kondo | |
| 2003/0086393 A1* | 5/2003 | Vasudevan et al. | 370/330 |
| 2003/0119511 A1 | 6/2003 | Shin | |
| 2004/0037291 A1 | 2/2004 | Attar et al. | |
| 2004/0114552 A1 | 6/2004 | Lim et al. | |
| 2004/0158790 A1 | 8/2004 | Gaal et al. | |
| 2004/0162097 A1 | 8/2004 | Vijayan et al. | |
| 2004/0235425 A1 | 11/2004 | Tayloe et al. | |
| 2005/0073975 A1 | 4/2005 | Chen et al. | |
| 2006/0135173 A1 | 6/2006 | Vannithamby | |
| 2006/0146867 A1* | 7/2006 | Lee et al. | 370/465 |
| 2006/0187883 A1 | 8/2006 | Abrol et al. | |
| 2007/0155388 A1 | 7/2007 | Petrovic et al. | |
| 2007/0173256 A1 | 7/2007 | Laroia et al. | |
| 2007/0201407 A1 | 8/2007 | Borran et al. | |
| 2010/0111152 A1 | 5/2010 | Bhushan et al. | |

FOREIGN PATENT DOCUMENTS

| | | |
|---|---|---|
| EP | 0902551 A2 | 3/1999 |
| EP | 1049349 A1 | 11/2000 |
| EP | 1059736 A2 | 12/2000 |
| EP | 1432261 A1 | 6/2004 |
| EP | 1507422 A1 | 2/2005 |
| JP | 9312869 | 12/1997 |
| JP | 2000350248 | 12/2000 |
| JP | 200136942 | 2/2001 |
| JP | 2001145147 | 5/2001 |
| JP | 2002519969 T | 7/2002 |
| JP | 2002305767 | 10/2002 |
| JP | 2004515932 | 5/2004 |
| JP | 2004519122 | 6/2004 |
| JP | 2004531124 | 10/2004 |
| JP | 2005006116 | 1/2005 |
| JP | 2005507606 A | 3/2005 |
| JP | 2005508588 | 3/2005 |
| JP | 2005517343 | 6/2005 |
| JP | 2006517761 | 7/2006 |
| JP | 2007502559 | 2/2007 |
| JP | 2007507949 T | 3/2007 |
| JP | 2008503924 A | 2/2008 |
| KR | 1020050084908 | 8/2005 |
| RU | 2143177 C1 | 12/1999 |
| RU | 2073913 | 3/2009 |
| WO | WO9205556 | 4/1992 |
| WO | WO9747154 | 12/1997 |
| WO | 9944313 | 9/1999 |
| WO | WO0001184 A1 | 1/2000 |
| WO | WO0133871 | 5/2001 |
| WO | WO0189162 | 11/2001 |
| WO | WO02078371 | 10/2002 |
| WO | WO03003784 A1 | 1/2003 |
| WO | WO03044970 A2 | 5/2003 |
| WO | 03067783 A2 | 8/2003 |
| WO | WO03090488 A1 | 10/2003 |
| WO | WO2004010602 A1 | 1/2004 |
| WO | WO2004060011 | 7/2004 |
| WO | WO2004064294 | 7/2004 |
| WO | WO2004064304 | 7/2004 |
| WO | WO2004100569 | 11/2004 |
| WO | WO2005018114 | 2/2005 |
| WO | WO2005018256 | 2/2005 |
| WO | WO2005034562 A1 | 4/2005 |
| WO | 2005041515 A | 5/2005 |
| WO | WO2005125253 | 12/2005 |
| WO | WO2006069296 | 6/2006 |

OTHER PUBLICATIONS

Nasipuri et. al., A MAC Protocol for Mobile Ad Hoc Network USing Directional Atennas, Sep. 2000, IEEE Wireless Communications and Networking Conference, 2000,vol. 3 pp. 1214-1219.*

Parsaee et. al. OFDMA for the 4th Geenration Cellular Networks, IEEE Canadian Conference on Electrical and Computer Engineering, 2004, May 2004, pp. 2325-2330.*

Bottomley et. al. A Generalized Rake Receiver for Interference Supression, Aug. 2000, IEEE Journal on Slected Areas in Communication vol. 18 No. 18, pp. 1536-1544.*

Ebeling et. al., Implementing an OFDM Reciever on the RaPiD Reconfigurable Architecture, Nov. 2004, IEEE Transactions on Computer vol. 53 No. 11 pp. 1436-1447.*

International Search Report—PCT/US2006/023094, International Search Authority—European Patent Office—Nov. 10, 2006.

International Preliminary Examination Report—PCT/US2006/023094, International Search Authority—The International Bureau of WIPO, Geneva, Switzerland—Dec. 17, 2007.

Written Opinion—PCT/US2006/023094, International Search Authority—European Patent Office—Dec. 16, 2007.

Group-orthogonal multicarrier CDMA Xiaodong Cai; Shengli Zhou; Giannakis, G.B.; Communication, IEEE Transaction on vol. 52, Issue 1, Jan. 2004 pp. 90-99.

Hwank, "A tendency of 23 GHz wireless super-high speed Internet technology," Data presented by HANARO Telecom, Inc., 2003.

Translation of Office Action in Japan application 2008-517041 corresponding to U.S. Appl. No. 11/447,378, citing JP2004515932, JP2004531124, JP2005517343, JP2005006116, JP2002519969 and WO2005034562 dated Mar. 15, 2011.

Translation of Office Action in Japan application 2008-517148 corresponding to U.S. Appl. No. 11/453,438, citing WO2004010602, WO04064304 and JP2000350248 dated Feb. 15, 2011.

* cited by examiner

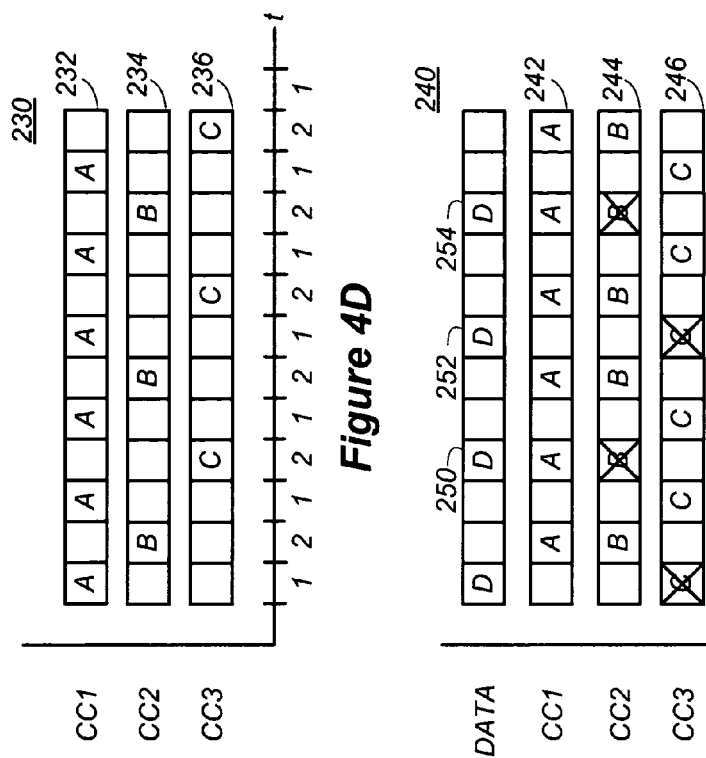
*Figure 4D*
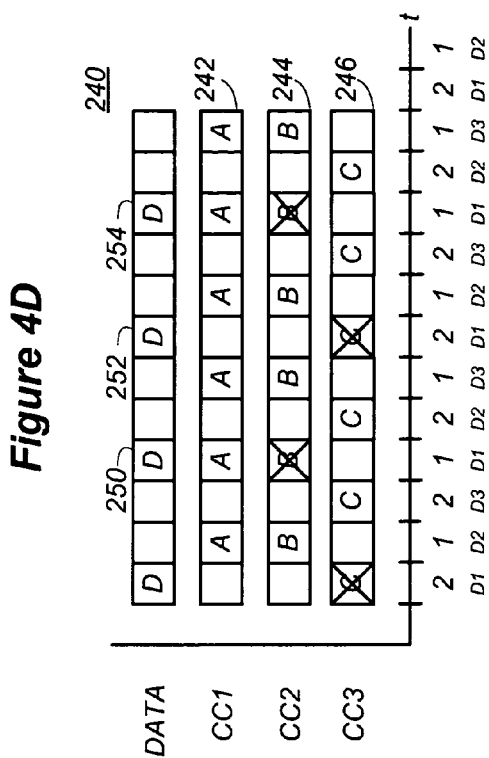
*Figure 4E*
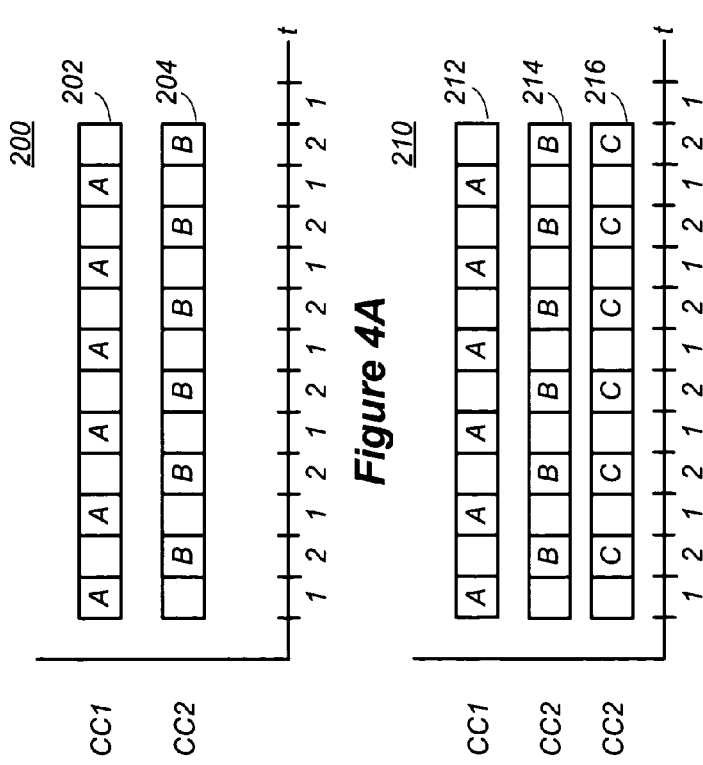
*Figure 4A*
*Figure 4B*
*Figure 4C*

OFDMA CONTROL CHANNEL INTERLACING

CLAIM OF PRIORITY UNDER 35 U.S.C. §119

The present Application for Patent claims priority to Provisional Application No. 60/691,436 filed Jun. 16, 2005, entitled "FH-OFDMA REVERSE-LINK CONTROL CHANNEL INTERLACING FOR HANDOFF," and assigned to the assignee hereof and hereby expressly incorporated by reference herein.

BACKGROUND

Wireless communication systems can be configured to support many different communication types. For example, a wireless communication system can support one-to-many, many-to-one, and one-to-one communications. Additionally, communications may be unidirectional or bidirectional. Thus, a wireless communication system that supports bidirectional communication having one-to-many communications in a first direction can support many-to-one communication in the opposite direction.

In a bi-directional communication system, the communication links can be allocated or can be randomly assigned. In the case of random assignment, a communication system may allocate one or more random access channels for requesting communication links and for reporting overhead information relating to assigned links.

A wireless communication system, such as an Orthogonal Frequency Division Multiple Access (OFDMA) communication system can allocate channels in both time and frequency. The transmitter in and OFDM system can be restricted to a particular power or power range. Thus, the use of overhead channels in addition to data channels can adversely affect the amount of energy available to support a data channel. However, the use of such overhead channels can be important for the operation of the system. In particular, a mobile device may need to communicate over multiple channels in order to negotiate a handoff between serving stations. It is desirable to minimize the effects of supporting multiple communication links to multiple random access channels.

BRIEF SUMMARY

Apparatus and methods for interlacing communications in random access control channels of an Orthogonal Frequency Division Multiple Access (OFDMA) wireless communication system are described. A wireless communication device communicating over distinct OFDMA control channels to multiple serving sectors may operate under link limited conditions. The wireless communication device can interlace the communications between the multiple serving sectors. The wireless communication device can interlace the control channel communications using one or more accessible resources. For example, the wireless communication device can interlace multiple control channel communications over time, frequency, code, or some combination thereof. The wireless communication device can configure the control channel communications such that the interlaces are relatively orthogonal to each other. For example, the wireless communication device can interlace multiple control channel communications over relatively orthogonal times, frequencies, codes, or some combination of orthogonal resources or combination of non-orthogonal resources with one or more orthogonal resource.

The wireless communication device can interlace the control channel communications in a number of interlaces equal to the number of distinct control channels over which communications are scheduled. In another embodiment, the wireless communication device divide the multiple scheduled control channel communications into two or more sets and can interlace the sets. In another embodiment, the wireless communication device can reserve a first interlace for control channel communications with the serving sector and can time multiplex the remaining control channel communications on one or more other interlaces.

Aspects of the disclosure include a method of configuring communications over a plurality of control channels assigned to a wireless device that includes determining a plurality of control channel interlaces, and interlacing communications to each of the plurality of control channels over the plurality of control channel interlaces.

Aspects of the disclosure include a method of configuring communications over a plurality of control channels assigned to a wireless device that includes receiving a first control channel assignment corresponding to a first sector, receiving a second control channel assignment corresponding to a second sector, and interlacing control messages over the first and second control channels.

Aspects of the disclosure include a method of configuring communications over a plurality of control channels assigned to a wireless device that includes determining a handoff condition, determining a control channel assignment of a serving sector, determining at least one control channel assignment of a non-serving sector, determining a control channel interlace, selectively configuring a control message for one of the control channel assignment of the serving sector or the at least one control channel assignment of the non-serving sector, and transmitting the control message.

Aspects of the disclosure include an apparatus configured to communicate over a plurality of assigned control channels. The apparatus includes a serving sector control module configured to selectively configure a first control message for a logical control channel corresponding to a serving sector, a non-serving sector control module configured to selectively configure a second control message for a logical control channel corresponding to a non-serving sector, and an interlace controller configured to determine a control channel interlace and control one of the serving sector control module or non-serving sector control module based on the control channel interlace.

Aspects of the disclosure include an apparatus configured to communicate over a plurality of assigned control channels. The apparatus includes means for determining a number of control channel assignments corresponding to a plurality of control channels, means for determining control channel interlace timing, and means for configuring at least one control channel message corresponding to one or more of the control channel assignments based on the control channel interlace timing and the number of control channel assignments.

Aspects of the disclosure include computer-readable medium encoded with a computer program to perform the steps of determining a plurality of control channel interlaces, and interlacing communications to each of the plurality of control channels over the plurality of control channel interlaces.

Aspects of the disclosure include computer-readable medium encoded with a computer program to perform the steps of determining a handoff condition, determining a control channel assignment of a serving sector, determining at least one control channel assignment of a non-serving sector, determining a control channel interlace, and selectively configuring a control message for one of the control channel assignment of the serving sector or the at least one control channel assignment of the non-serving sector.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 4A-4E are simplified time-logical channel diagrams of embodiments of control channel interlacing.

DETAILED DESCRIPTION OF EMBODIMENTS OF THE DISCLOSURE

Figure 1:
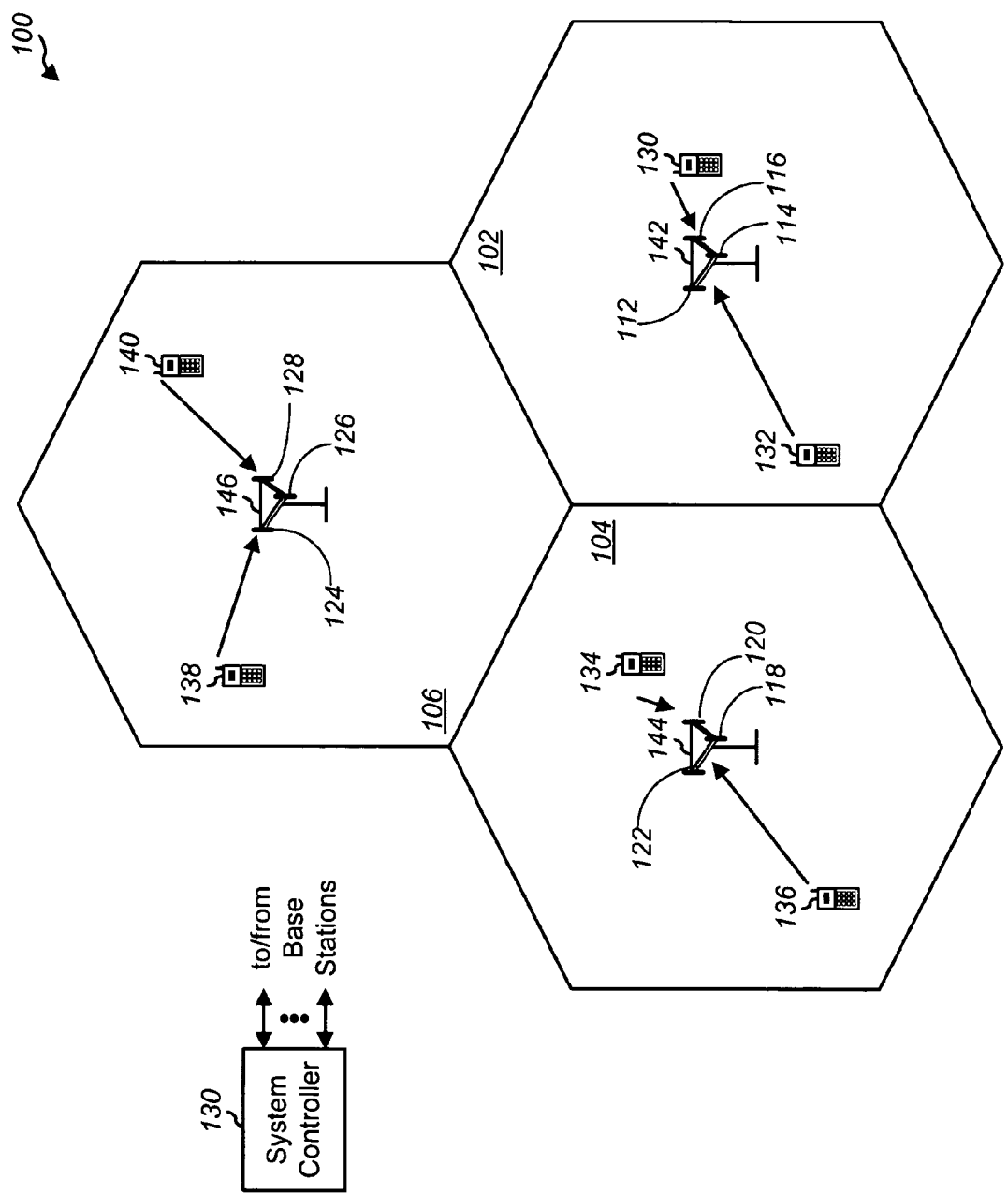
FIG. 1 is a simplified functional block diagram of an embodiment of a multiple access communication system according to one embodiment.

FIG. 1 is a simplified functional block diagram of an embodiment of a multiple access wireless communication system 100. A multiple access wireless communication system 100 includes multiple cells, e.g. cells 102, 104, and 106. In the embodiment of FIG. 1, each cell 102, 104, and 106 may include an access point 150 that includes multiple sectors.

The multiple sectors are formed by groups of antennas each responsible for communication with access terminals in a portion of the cell. In cell 102, antenna groups 112, 114, and 116 each correspond to a different sector. For example, cell 102 is divided into three sectors, 120a-102c. A first antenna 112 serves a first sector 102a, a second antenna 114 serves a second sector 102b, and a third antenna 116 serves a third sector 102c. In cell 104, antenna groups 118, 120, and 122 each correspond to a different sector. In cell 106, antenna groups 124, 126, and 128 each correspond to a different sector.

Each cell is configured to support or otherwise serve several access terminals which are in communication with one or more sectors of the corresponding access point. For example, access terminals 130 and 132 are in communication with access point 142, access terminals 134 and 136 are in communication with access point 144, and access terminals 138 and 140 are in communication with access point 146. Although each of the access points 142, 144, and 146 is shown to be in communication with two access terminals, each access point 142, 144, and 146 is not limited to communicating with two access terminals and may support any number of access terminals up to some limit that may be a physical limit, or a limit imposed by a communications standard.

As used herein, an access point may be a fixed station used for communicating with the terminals and may also be referred to as, and include some or all the functionality of, a base station, a Node B, or some other terminology. An access terminal (AT) may also be referred to as, and include some or all the functionality of, a user equipment (UE), a user terminal, a wireless communication device, a terminal, a mobile station or some other terminology.

It can be seen from FIG. 1 that each access terminal 130, 132, 134, 136, 138, and 140 is located in a different portion of it respective cell than each other access terminal in the same cell. Further, each access terminal may be a different distance from the corresponding antenna groups with which it is communicating. Both of these factors provide situations, in addition to environmental and other conditions in the cell, to cause different channel conditions to be present between each access terminal and its corresponding antenna group with which it is communicating.

Each access terminal, for example 130, typically experiences unique channel characteristics not experienced by any other access terminal because of the varying channel conditions. Furthermore, the channel characteristics change over time and vary due to changes in location.

An access terminal, for example 130, can communicate with antenna 116 of access point 142 corresponding to a serving sector to compensate for the different channel conditions. The access point 142 corresponding to the serving sector assigns a variable data rate based in part on the channel characteristics experienced by the access terminal 130. The access point 142 of the serving sector can transmit information at a data rate that is higher than a nominal data rate when the channel characteristics experienced by the access terminal 130 are favorable, and can transmit information at a data rate that is lower than a nominal data rate when the channel characteristics experienced by the access terminal 130 are degraded.

The access terminal 130 can communicate feedback information to the access point 142 of the serving sector to assist the access point 142. For example, the access terminal 130 can communicate a channel metric, such as a Channel Quality Index (CQI) to the access point 142 of the serving sector to provide an indication of the channel quality. The access point 142 can determine the data rate for subsequent information transmitted to the access terminal 130 based in part on the CQI value.

The access terminal 130 transmits the CQI information to the access point 142 of the serving sector over a control channel. The access terminal 130 can also send other control information to the access point 142 of the serving sector. The other control information that can be included in control messages can include, but is not limited to, requests (REQ) for data channel assignments, acknowledgements (ACK) in response to successful receipt of information transmitted by the access terminal 142, and other control information.

The control channel can be a predetermined reverse link channel that is dedicated for control information. Alternatively, the control channel can share resources with another channel, The shared resources can include, for example, time, frequency, codes, and the like or some other resource or combination of resources. As used herein, the term "reverse link" refers to the communication link from an access terminal to an access point.

In an embodiment where the multiple access wireless communication system 100 is an Orthogonal Frequency Division Multiple Access (OFDMA) system, the control channel can be a predetermined configuration of subcarriers in the reverse link. The control channel can also have a predetermined timing relative to a time reference. For example, the reverse link data channel can be arranged in blocks of OFDM symbols, where one predetermined number of adjacent symbols is defined as a slot. For example, a slot can have 16 OFDM symbols. The control channel can be defined to occur during a predetermined time in the slot, for example, during the first half of the slot.

If the multiple access wireless communication system 100 employs frequency hopping (FH), the data and control channels can be assigned as logical channels, sometimes referred to as hop ports, and the logical channels can be mapped to physical channels according to a predetermined frequency hopping algorithm. Thus, in a frequency hopping OFDMA system, the physical subcarrier frequencies assigned to the logical channels change over time. For example, the frequency hopping algorithm can periodically update the logical channel to physical subcarrier mapping, for example, each OFDM symbol, each slot, or following some other predetermined number of OFDM symbols.

Under certain conditions, the access terminal may need or desire to transmit control channel messages to more than one sector, and possibly corresponding to more than one access point. The access terminal is assigned a distinct control channel for each sector. For example, an access terminal communicating control messages to two distinct sectors is assigned two distinct control channels.

A typical situation where an access terminal transmits control channel messages to multiple receivers is a handoff condition. During handoff, an access terminal communicates over the control channel with the access point of the serving sector and with the one or more access points corresponding to each the candidate sectors. In some situations, the access point corresponding to a serving sector will be the same access point corresponding to a candidate sector. In other situations, the access terminal may communicate with multiple distinct access points, where no two sectors correspond to the same access point. In yet other situations, the access terminal can communicate with multiple access points corresponding to multiple sectors, where at least two sectors correspond to the same access point. In each of the situations, the access point is assigned a distinct control channel for the serving sector and each candidate sector, and the access point transmits control channel messages using each of the assigned communication channels.

As previously discussed, in a handoff situation between multiple sectors, an access point transmits control channel messages to one or more access points serving multiple sectors. The need to transmit additional control messages reduces the transmit power available to the access terminal for data transmission. One way to reduce the required transmit power for access terminals transmitting control messages to access points corresponding to multiple sectors is to interlace the messaging over the control channel assignments. The access terminal can interlace the control channel messages according to a predetermined control channel interlacing process. The access terminal can interlace the control message transmissions in time, frequency, or a combination thereof, where the interlaces may be fixed or dynamically varying logical or physical resources that are grouped together.

In the situation where the access terminal is assigned two control channels, corresponding, for example, to the serving sector and a candidate sector, the access terminal can transmit the control channel messages using two interlaces. In a first embodiment, with two control channel interlaces, when the access terminal is assigned a second sector to transmit control channels, the assigned control channel interlace is made on the opposite interlace from the serving sector. For example, the access terminal transmits control information to its serving sector on control interlace one, and to the non-serving sector on control interlace two. At any point in time, in this embodiment, the access terminal is only sending control information to one sector, reducing the required transmit power.

If the access terminal needs to send control information to the serving sector and two other sectors, then there are several possible extensions to the above embodiment. A first embodiment includes adding additional interlaces. For three sectors there would be three control channel interlaces.

A second embodiment includes bunching up control messages. For three sectors, the control messages for two sectors would be sent on interlace one while the control for the third sector would be sent on interlace two. This embodiment provides some decrease in transmit power balanced against increasing latency in receiving the control signals.

A third embodiment includes creating sub-interlaces for control channel messages sent to the non-serving sectors. In this case the control channel to the serving sector is placed on interlace one, and the control channels to the non-serving sectors are placed on interlace two. However, the access terminal only sends control information on interlace two to one non-serving sector at a time.

When a handoff is completed, the control channels are reassigned to maintain this asymmetry with the new serving sector control channels on one interlace and the non-serving sector control channels on another interlace. This creates a lower latency control channel to the serving sector, maintaining multi-user diversity gains, with a higher latency control channel to the non-serving sectors for reverse link channel quality and handoff requests. The non-serving sector control channels transmitted one at a time on the opposite interlace from the serving sector may either be cycled through in a periodic order, or the access terminal may decide which sector to transmit control to out of order based on available information, such as a desired handoff request.

Figure 2:
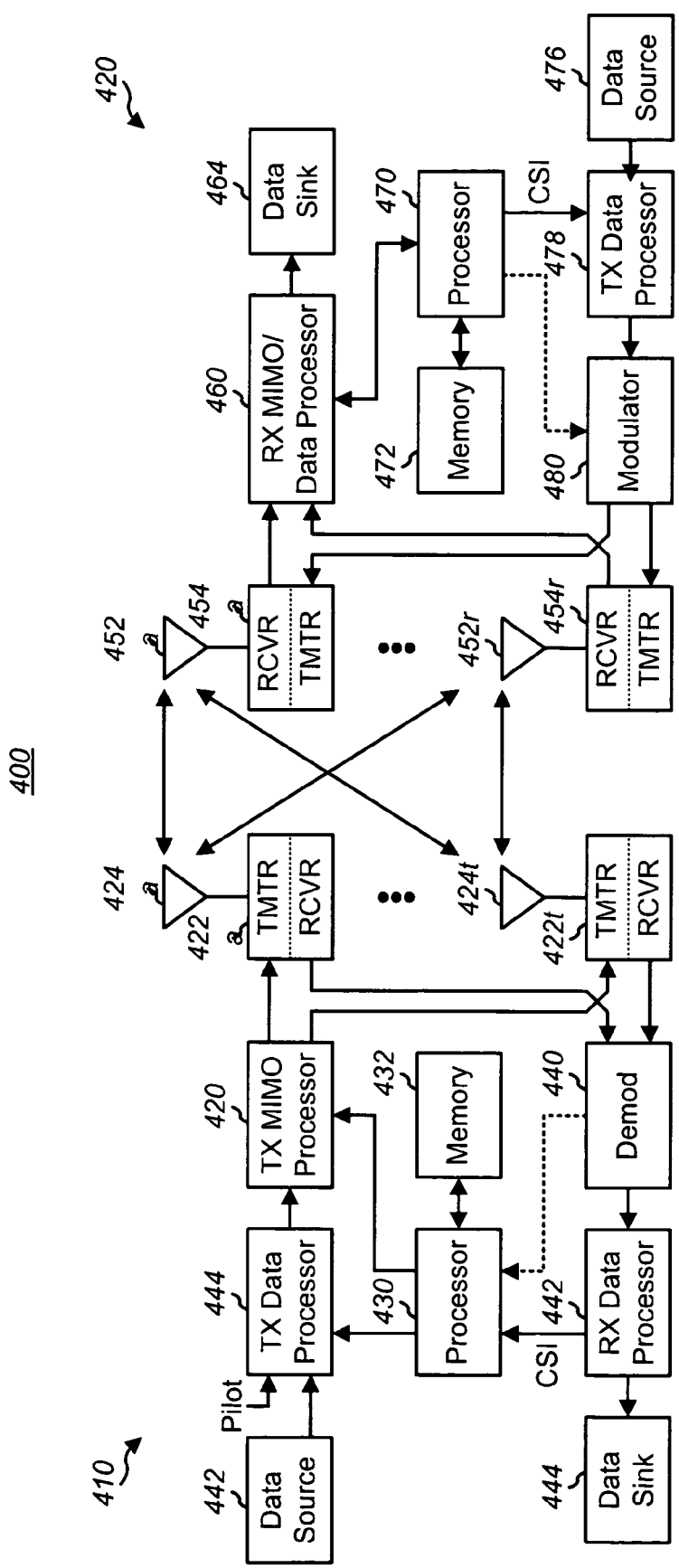
FIG. 2 is a simplified functional block diagram of an embodiment of a transmitter and receiver in a multiple access wireless communication system.

The above embodiments can be implemented utilizing transmit (TX) processor 420 or 460, processor 430 or 470, and memory 432 or 472, as shown in FIG. 2. The processes may be performed on any processor, controller, or other processing device and may be stored as computer readable instructions in a computer readable medium as source code, object code, or otherwise.

FIG. 2 is a simplified functional block diagram of an embodiment of a transmitter and receiver in a multiple access wireless communication system. At transmitter system 410, traffic data for a number of data streams is provided from a data source 412 to a transmit (TX) data processor 414. In an embodiment, each data stream is transmitted over a respective transmit antenna. TX data processor 414 formats, codes, and interleaves the traffic data for each data stream based on a particular coding scheme selected for that data stream to provide coded data. In some embodiments, TX data processor 414 applies beamforming weights to the symbols of the data streams based upon the user to which the symbols are being transmitted and the antenna from which the symbol is being transmitted. In some embodiments, the beamforming weights may be generated based upon channel response information that is indicative of the condition of the transmission paths between the access point and the access terminal. The channel response information may be generated utilizing CQI information or channel estimates provided by the user. Further, in those cases of scheduled transmissions, the TX data processor 414 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions provided by processor 430. In some embodiments, the number of parallel spatial streams may be varied according to the rank information that is transmitted from the user.

The modulation symbols for all data streams are then provided to a TX MIMO processor 420, which may further process the modulation symbols (for example, for OFDM). TX MIMO processor 420 then provides NT symbol streams to NT transmitters (TMTR) 422a through 422t. In certain embodiments, TX MIMO processor 420 applies beamforming weights to the symbols of the data streams based upon the user to which the symbols are being transmitted and the antenna from which the symbol is being transmitted from that users channel response information.

Each transmitter 422a through 422t receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 422a through 422t are then transmitted from NT antennas 424a through 424t, respectively.

At receiver system 450, the transmitted modulated signals are received by NR antennas 452a through 452r and the received signal from each antenna 452 is provided to a respective receiver (RCVR) 454. Each receiver 454 conditions (e.g., filters, amplifies, and downconverts) a respective received signal, digitizes the conditioned signal to provide samples, and further processes the samples to provide a corresponding "received" symbol stream.

An RX data processor 460 then receives and processes the $N_R$ received symbol streams from $N_R$ receivers 454 based on a particular receiver processing technique to provide the rank number of "detected" symbol streams. The processing by RX data processor 460 is described in further detail below. Each detected symbol stream includes symbols that are estimates of the modulation symbols transmitted for the corresponding data stream. RX data processor 460 then demodulates, deinterleaves, and decodes each detected symbol stream to recover the traffic data for the data stream. The processing by RX data processor 460 is complementary to that performed by TX MIMO processor 420 and TX data processor 414 at transmitter system 410.

The channel response estimate generated by RX processor 460 may be used to perform space, space/time processing at the receiver, adjust power levels, change modulation rates or schemes, or other actions. RX processor 460 may further estimate the signal-to-noise-and-interference ratios (SNRs) of the detected symbol streams, and possibly other channel characteristics, and provides these quantities to a processor 470. RX data processor 460 or processor 470 may further derive an estimate of the "effective" SNR for the system. Processor 470 then provides estimated channel information, such as the Channel Quality Index (CQI), which may comprise various types of information regarding the communication link and/or the received data stream. For example, the CQI may comprise only the operating SNR. The CQI is then processed by a TX data processor 438, which also receives traffic data for a number of data streams from a data source 476, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to recover the CQI reported by the receiver system. The reported CQI is then provided to processor 430 and used to (1) determine the data rates and coding and modulation schemes to be used for the data streams and (2) generate various controls for TX data processor 414 and TX MIMO processor 420.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the $N_T$ transmit and $N_R$ receive antennas may be decomposed into $N_S$ independent channels, with $N_S \leq \min\{N_T, N_R\}$. Each of the Ns independent channels may also be referred to as a spatial subchannel (or a transmission channel) of the MIMO channel and corresponds to a dimension.

Figure 3:
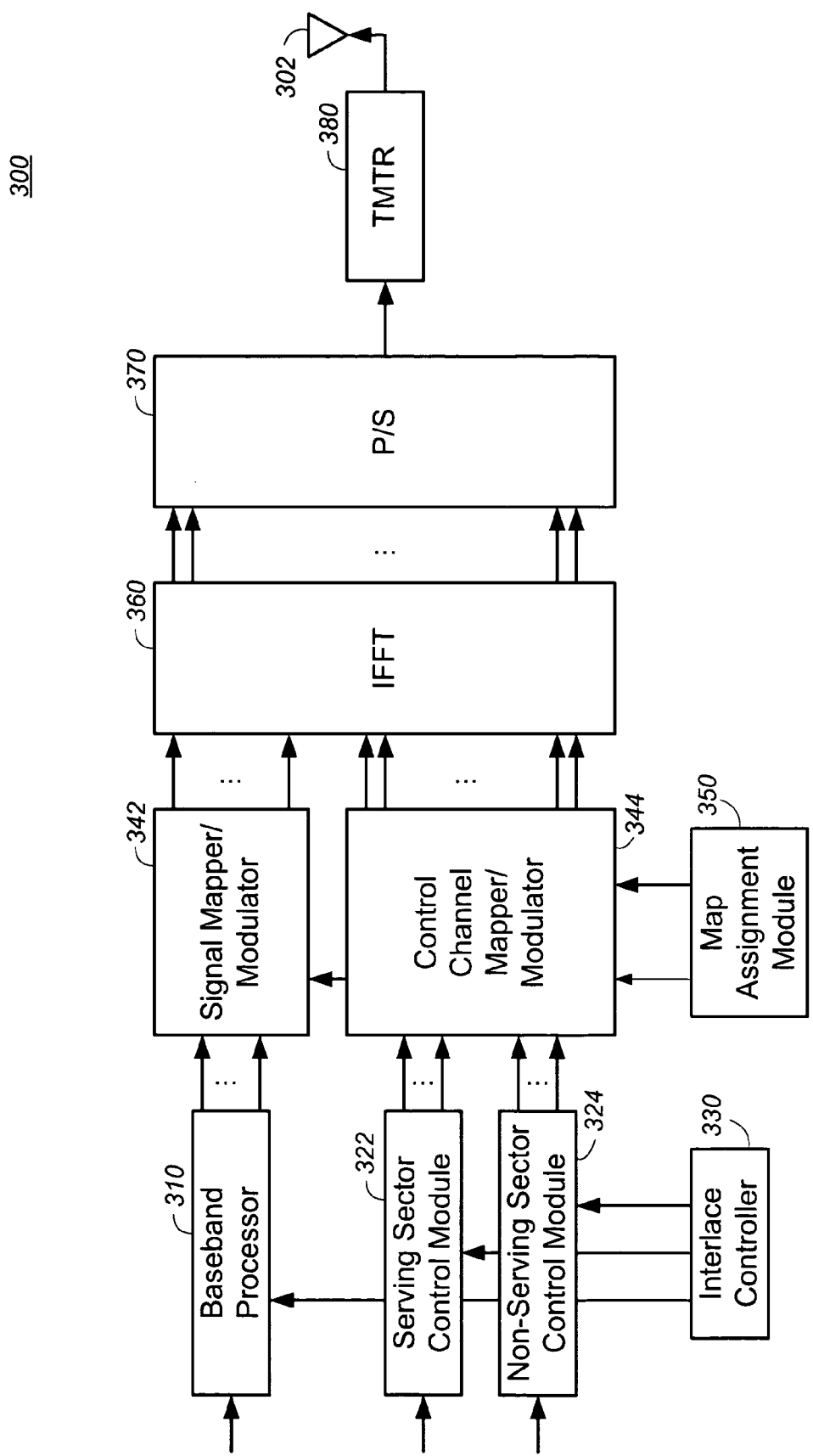
FIG. 3 is a simplified functional block diagram of embodiment of a transmitter implementing control channel interlacing.

FIG. 3 is a simplified functional block diagram of an embodiment of a transmit processing subsystem 300 of a receiver system, such as the receiver system 450 of FIG. 2. The transmit processing subsystem 300 is configured to perform control channel interlacing.

The transmit processing subsystem 300 includes a baseband processor 310 configured to receive one or more data or information streams from one or more data sources (not shown). The baseband processor 310 can process each of the data or information streams, for example, by amplifying, filtering, interleaving, encoding the streams from the data sources. The baseband processor 310 can process each data stream independently, can combine two or more of the data streams for processing, or can process some data streams independently while combining two or more distinct data streams.

The baseband processor 310 receives timing and data interlace information from an interlace controller 330. The interlace controller 330 can maintain data symbol, slot, and frame timing as well as data interlace timing. The various data streams can be assigned to a particular data interlace from a plurality of data interlaces. A data interlace can be viewed as a time division multiplex timing assignment for a particular logical channel. That is, each logical data channel can include a plurality of data interlaces, to which any one of the multiple data streams can be assigned.

The data interlace can have a duration that substantially corresponds to a predetermined duration, that can be, for example a predetermined number of symbols, slots, frames, or some other timing increment. The use of a data interlace can be advantageous in a communication system that implements an acknowledgement (ACK) signal that indicates successful receipt of transmitted data. The receiver can process received signals and communicate the ACK during the time between adjacent data interlaces to reduce the retransmission time. In one embodiment, the interlace controller 330 is configured to track six data interlaces.

The baseband processor 310 couples the processed data streams to a data signal mapper/modulator 342. The data signal mapper/modulator 342 is configured to map one or more logical data channels to corresponding physical subcarriers of an OFDM symbol. In one embodiment, the data signal mapper/modulator 342 receives a serial data stream from the baseband processor 310 and operates to convert the serial data stream into a parallel data stream having a number of parallel data streams equal to a number of subcarrier assignments. The data signal mapper/modulator 342 modulates the assigned physical subcarriers with the corresponding data streams according to a predetermined modulation type. As described earlier, the predetermined modulation type can be, for example, one of BPSK, QPSK, M-PSK, or M-QAM.

A hop assignment module 350 determines the subcarriers assigned to the various logical channels based on, for example, an initial frequency assignment and a frequency hopping algorithm or pattern. The hop assignment module 350 identifies the physical subcarrier assignments corresponding to the logical data channels and communicates the information to the data signal mapper/modulator 342.

Control channel information that is to be included onto OFDM symbols is processed in a manner similar to the data processing. A serving sector control module 332 is configured to receive control information that is to be communicated to the access point of the serving sector on the control channel assigned to the access terminal corresponding to the serving sector. For example, the serving sector control module 332 can be configured to receive channel requests from a data source (not shown) and CQI information corresponding to received signals processed in a RX data processor (not shown).

The serving sector control module 332 is configured to process the received signals, and can interleave, encode, and otherwise format the control messages. The serving sector control module 332 receives timing and control channel interlace information from the interlace controller 330. The information can include the interlace assignment and timing related to the assigned control channel interlace.

The communication link can be configured to support a plurality of control channel interlaces that can be the same, or distinct from the data interlaces. In an embodiment, there may be a minimum number of control channel interlaces, and the interlace controller 330 can track the occurrence and control channel interlace assigned to the control channel for the serving sector. The serving sector control module 332 couples the processed serving sector control messages to a control channel mapper/modulator 344.

Similarly, a non-serving sector control module 324 is configured to receive the control messages for the non-serving sectors. There are occasions when there are no non-serving sector control channels, and other occasions when the access terminal is assigned one or more non-serving sector control channels.

The non-serving sector control module 324 independently processes each of the control messages corresponding to each of the assigned control channels exclusive of the control channel for the serving sector. The non-serving sector control module 324 can process each of the control message in substantially the same way that the serving sector control module 322 processes messages for the serving sector control channel. The non-serving sector control module 324 receives timing and control channel interlace information from the interlace controller 330. The information can include the interlace assignment and timing related to the one or more assigned control channels. The non-serving sector control module 324 couples the control channel messages for the one or more non-serving sector control channels based on the interlace process executed by the interlace controller 330. As described in further detail below, the interlace controller 330 can implement an interlace process that controls the timing and interlacing of the control channel messages over available control channel interlaces.

The control channel mapper/modulator 344 operates to map each of the control channel messages on each of the control channel logical assignments to the corresponding physical subcarriers of each OFDM symbol. Each of the logical control channel assignments can be mapped to a corresponding set of OFDM subcarriers. The control channel mapper/modulator 344 operates to modulate each of the control channel information onto the corresponding subcarriers.

Because of the control channel interlacing, not every assigned control channel generates control channel information each control channel interlace. The hop assignment module 350 determines the physical subcarrier hop assignments, and can determine the subcarrier assignments independently for each logical control channel.

The data signal mapper/modulator 342 and the control channel mapper/modulator 344 couple the modulated subcarriers to an OFDM signal generator that can include an Inverse Fast Fourier Transform (IFFT) module 360 configured to transform the modulated subcarriers to a time domain OFDM symbol samples.

The output of the IFFT module 370 is coupled to a parallel to serial converter 370 that converts the parallel IFFT output to a serial signal stream of OFDM samples. The parallel to serial converter 370 couples the OFDM symbol samples to a transmitter 380 that performs signal processing to frequency translate the OFDM symbol samples to a transmit RF signal. The transmitter 380 couples the transmit RF signal to the antenna 382 to couple the signal to one or more access points.

As discussed above, the interlace controller 330 executes a control channel interlace process to determine the timing of the control channel messages corresponding to a plurality of assigned control channels, one of which corresponds to the serving sector. The interlace controller 330 can implement any of a variety of interlace processes, and the processes discussed herein are illustrative of the types of interlace processes. The interlace controller 330 can determine the assigned control channel interlaces and can, in some embodiments, determine when to puncture control channel information.

The receiver system can receive a first control channel assignment corresponding to the control channel of the serving sector and can receive one or more additional control channel assignments corresponding to one or more non-serving sectors. The interlace controller 330 can maintain a record of the number of assigned control channels, and can determine the interlaces based on the number of assigned control channels and the interlace process.

Control channel interlacing can be advantageous in an OFDM communication system in conditions where the communications are link limited. A link limited situation can occur when the path loss from the access terminal to the access point is at the high end of a serviceable range. The high path loss situation can occur due to obstructions and physical terrain or due to proximity. An access terminal near the edge of a coverage area typically operates in a link limited environment.

The access point and access terminal may compensate, in part, for the link limited condition by decreasing the transmitted data or information rate. However, at some point, even the lowest data rate transmission can experience a link limited condition.

An access terminal can experience link limited communications when it is close to a handoff. The access terminal can communicate with adjacent access points to negotiate a handoff when it experiences a link limited condition. The access terminal can continue to communicate on a control channel of the serving sector, and can request and be assigned a control channel to one or more candidate sectors. As noted earlier, the candidate sectors can be served by one or more access points that are common with or distinct from the access point supporting the serving sector.

The link limited communication from the access terminal to the access point in an OFDM system can be further degraded by the inclusion of the additional control channels, if control channel interlacing is not implemented. The additional control channels can operate to further limit the power available to support the data channel. Thus, the inclusion of additional control channels, used to support handoff in a link limited condition, can operate to further degrade the link limited communication link. Control channel interlacing operates to minimize the effects of the additional control channels on the link limited data channel.

FIGS. 4A-4E illustrate examples of control channel interlacing processes that may be implemented in the interlace controller. Typically, the interlace controller implements one particular interlace process. However, in some embodiments, the interlace controller may determine which of a plurality of interlace processes to implement, and may change which of the interlace processes is active.

FIG. 4A is a simplified time-logical channel diagram 200 of an embodiment of control channel interlacing. In the embodiments illustrated in FIG. 4A, the transmitter is assigned two control channels, control channel 1 (CC1) 202 and control channel 2 (CC2) 204. Additionally, the system may be configured with two control channel interlaces.

The transmitter operates to interlace the two control channels. Thus, the transmitter, via the interlace controller, assigns CC1 202 to the first control channel interlace and assigns CC2 204 to the second control channel interlace. During the corresponding interlace, the logical control channel is mapped to the physical subcarriers of the OFDM symbol, for example based on a frequency hopping process. Thus, a data channel never simultaneously operates in conjunction with greater than one control channel.

FIG. 4B illustrates an extension of the process illustrated in FIG. 4A, for operation with more than two control channels corresponding to non-serving sectors. FIG. 4B is a simplified time-logical channel diagram 210 of an embodiment of control channel interlacing. In the embodiment of FIG. 4B, the transmitter is assigned three control channels. A first control channel (CC1) 212 corresponds to the serving sector, while second and third control channels, CC2 214 and CC3 214 correspond to non-serving sectors.

The communication system includes two control channel interlaces, as illustrated in FIG. 4A. The interlace controller within the transmitter operates to interlace the control channel messages across the various control channels by assigning the control channel, CC1 212, corresponding to the serving sector to the first control channel interlace, and assigning all other control channels, CC2 214 and CC3 216, to the second control channel interlace. The interlace controller effectively prioritizes the control channel CC1 212 over the non serving control channels CC2 214 and CC3 216. However, the data transmissions may be degraded during the second interlace depending on the number of non-serving control channels. If the interlace controller assigns all non-serving sector control channels to the second interlace, and there is greater than one non-serving sector control channel, the additional control channels can degrade an already link limited data link.

FIG. 4C is a simplified time-logical channel diagram 220 of an embodiment of control channel interlacing. In the embodiment of FIG. 4C, the interlace controller interlaces the control channels using a process that assigns only one control channel to each control channel interlace. In the embodiment of FIG. 4C, the interlace controller assigns each control channel to a distinct control channel interlace. Thus, the number of control channel interlaces can be dynamic, and can correspond to the total number of control channels assigned to the access terminal.

The interlace controller assigns a first control channel interlace to the serving sector control channel, CC1 222. The interlace controller assigns a second control channel interlace to the a first non-serving sector control channel, CC2 224, and a third control channel interlace to the a second non-serving sector control channel, CC3 226. The interlace controller can extend the assignment of control channel interlaces to support any additional control channels.

FIG. 4C is a simplified time-logical channel diagram 230 of an embodiment of control channel interlacing. In the embodiment of FIG. 4D, the interlace controller assigns the control channels to one of two control channel interlaces. The interlace controller assigns the control channel of the serving sector, CC1 232, to the first control channel interlace. The interlace controller assigns the control channels, CC2 234 and CC3 236, to the second control channel interlace in a round robin order. The process can be extended to any number of non-serving sector control channels, and can be extended to any number of control channel interlaces.

FIG. 4D is a simplified time-logical channel diagram 240 of an embodiment of control channel interlacing. The embodiment of FIG. 4D illustrates a process in which the interlace controller monitors the data interlace and operates to selectively puncture a control channel message.

As described above, the data channel can be assigned to one of a plurality of data interlaces. The number of data interlaces can be distinct from the number of control channel interlaces. In the embodiment of FIG. 4D, there are three data interlaces and two control channel interlaces.

The data channel 242 is assigned to one of three data interlaces. The control channels are assigned to one of two control channel interlaces according to an interlace process. In the embodiment of FIG. 4D, the serving sector control channel, CC1 244, and a first non serving sector control channel, CC2 246, are assigned to the first control channel interlace, while a second non-serving sector control channel, CC3 248, is assigned to the second control channel interlace.

The interlace controller operates to puncture the non-serving sector control channel messages when the control channel interlace coincides with the assigned data channel interlace. In a first time period 250, the transmitter is scheduled to transmit the data channel 242 and the serving sector control channel CC1 244 and the first non-serving sector control channel CC2 246. However, because the data interlace coincides with the control channel interlace, the interlace controller punctures the non-serving sector control channel message. Thus, the interlace controller operates to puncture, or otherwise omit transmission of, the control message for the first non-serving sector control channel CC2 246. This same situation occurs in a third time period 254, and the interlace controller again operates to puncture the control message corresponding to the first non-serving sector control channel CC2 246.

In a second time period 252, the data interlace coincides with the second control channel interlace. The interlace controller operates to puncture the second control channel message.

The interlace controller thus operates to puncture the control messages corresponding to the non-serving sector control channels any time that they coincide with the data channel. Puncturing the control channel messages can be advantageous in that the control messages corresponding to the non-serving sector control channels have essentially no effect on the data channel. The non-serving sector control channels do not degrade a potentially link limited data channel. Thus, to the serving sector access point, the access terminal appears to operate in the absence of any non-serving sector control channels.

Although the embodiments described above in relation to FIGS. 2, 3, and 4A-4E have focused on OFDM control channel communications that are time interlaced, the control channels are not limited to OFDM control channels and the interlacing of the control channels is not limited to time interlacing. The access terminal can interlace the control channel communications using one or more accessible resources. For example, the access terminal can interlace multiple control channel communications over interlaces of time, frequency, code, or some combination thereof. The access terminal can configure the control channel communications such that the interlaces are relatively orthogonal to each other. For example, the access terminal can interlace multiple control channel communications over relatively orthogonal times, frequencies, codes, or some combination of orthogonal resources or combination of non-orthogonal resources with one or more orthogonal resource.

In one embodiment, the access terminal can frequency domain interlace the various control channels. Similarly, in another embodiment, the access terminal can code division interlace the control channel communications. Other access terminal embodiments can implement a combination of interlace mechanisms, for example, interlacing control channel communications over some combination or time and code or some combination of frequency and code.

It should be noted that the number of interlaces and control channel interlaces may vary, e.g. dynamically, or may be an overhead parameter specified by the communication system.

Figure 5:
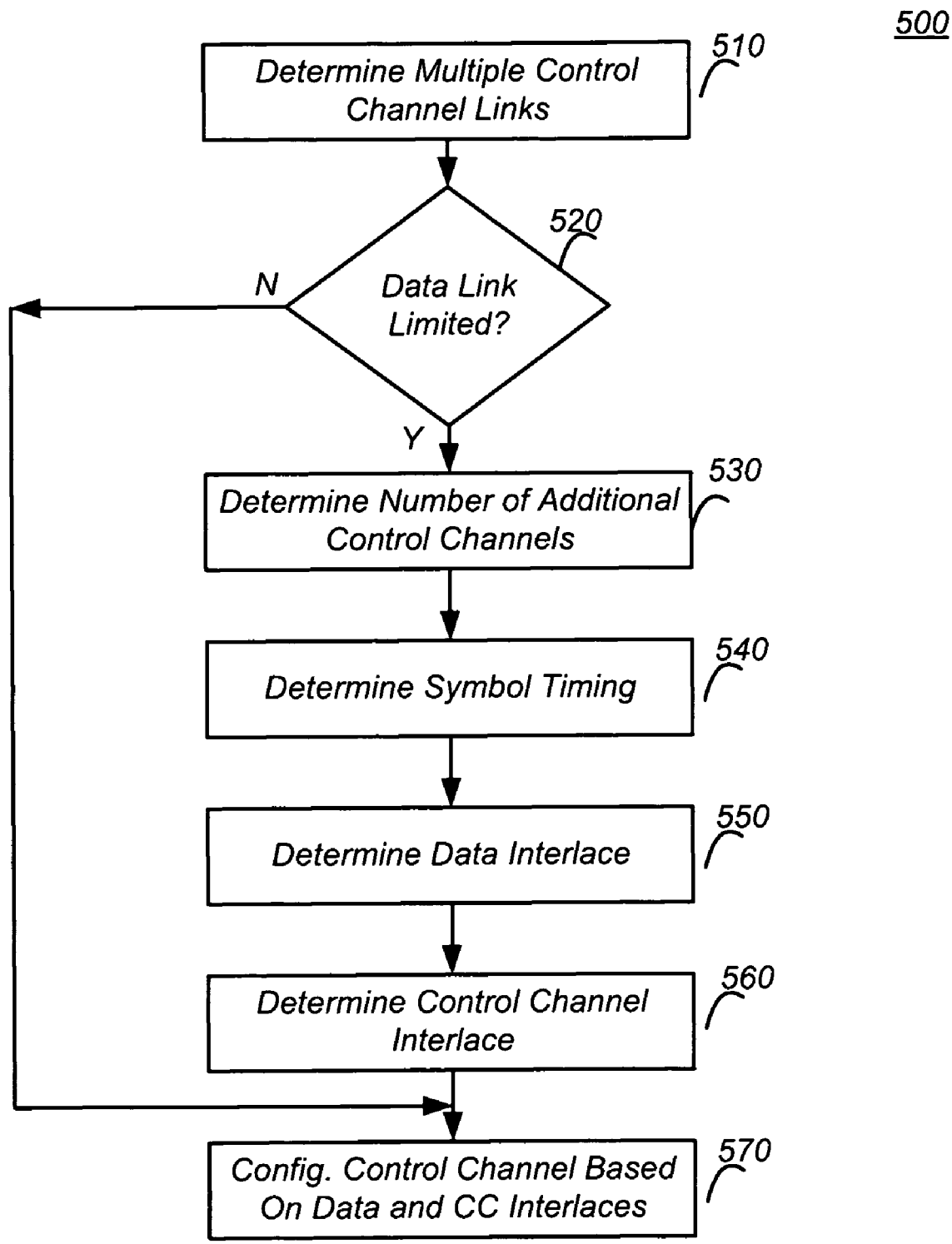
FIG. 5 is a simplified flowchart of an embodiment of a method of control channel interlacing.

FIG. 5 is a simplified flowchart of an embodiment of a method 500 of control channel interlacing. The method 500 can be performed, for example, by the interlace controller of the transmitter of FIG. 3.

The method 500 begins at block 510 where the interlace controller determines that there are multiple control channel links. The interlace controller can determine this, for example, by determining that the access terminal has received a control channel assignment that is in addition to the control channel corresponding to the serving sector. In another example, the interlace controller can determine that the access terminal is assigned multiple control channels via one or more flags or status indicators that indicate the presence of multiple control channel assignments.

The interlace controller proceeds to decision block 520 and determines whether the data communication link is one that is link limited. For example, the interlace controller can be configured to interlace the control channels only in those situations where the multiple control channels have the possibility of degrading the link limited channel. The interlace controller can determine that the data communication link is link limited by determining the data rate assigned to the link, or by examining some metric of the link quality, such as a CQI for the communication link. Alternatively or additionally, the interlace controller can determine that a data channel is link limited by determining that the access terminal is processing a handoff.

If the interlace controller determines that the data channel is not link limited, the interlace controller proceeds from decision block 520 to block 570, and does not interlace the control channel messages. If, instead, the interlace controller determines that the data channel is link limited, the interlace controller proceeds from decision block 520 to block 530.

At block 530, the interlace controller determines the actual number of control channels assigned to the access terminal. In some embodiments, this function can be integrated into the function performed in block 510.

After determining the number of control channels assigned to the access terminal, the interlace controller proceeds to block 540 and determines symbol timing, for example, for OFDM symbols. The symbol timing can include symbol frame and slot timing, and can include a reference number identifying the position of the symbol in a frame of symbols.

The interlace controller proceeds to block 550 and determines a data interlace, if any, assigned to the data channel for the access terminal. Additionally, the interlace controller can determine which data interlace is presently active or is being configured for transmission. As described before, the data channel can be assigned to one or more specific data interlaces from a plurality of data interlaces. The identity of the data interlace can be advantageous for those interlace processes that puncture non-serving control channel messages.

The interlace processor proceeds to block 560 and determines the control channel interlaces assigned to the access terminal and determines which of the control channel interlaces is presently active or being configured for transmission. In one embodiment, the interlace controller can determine and assign the number of control channel interlaces. The interlace controller proceeds to block 570 and configures the identified control channel interlace for one or more control channel messages, based on a control channel interlace process, such as one of the processes illustrated in FIGS. 4A-4E.

Figure 6:
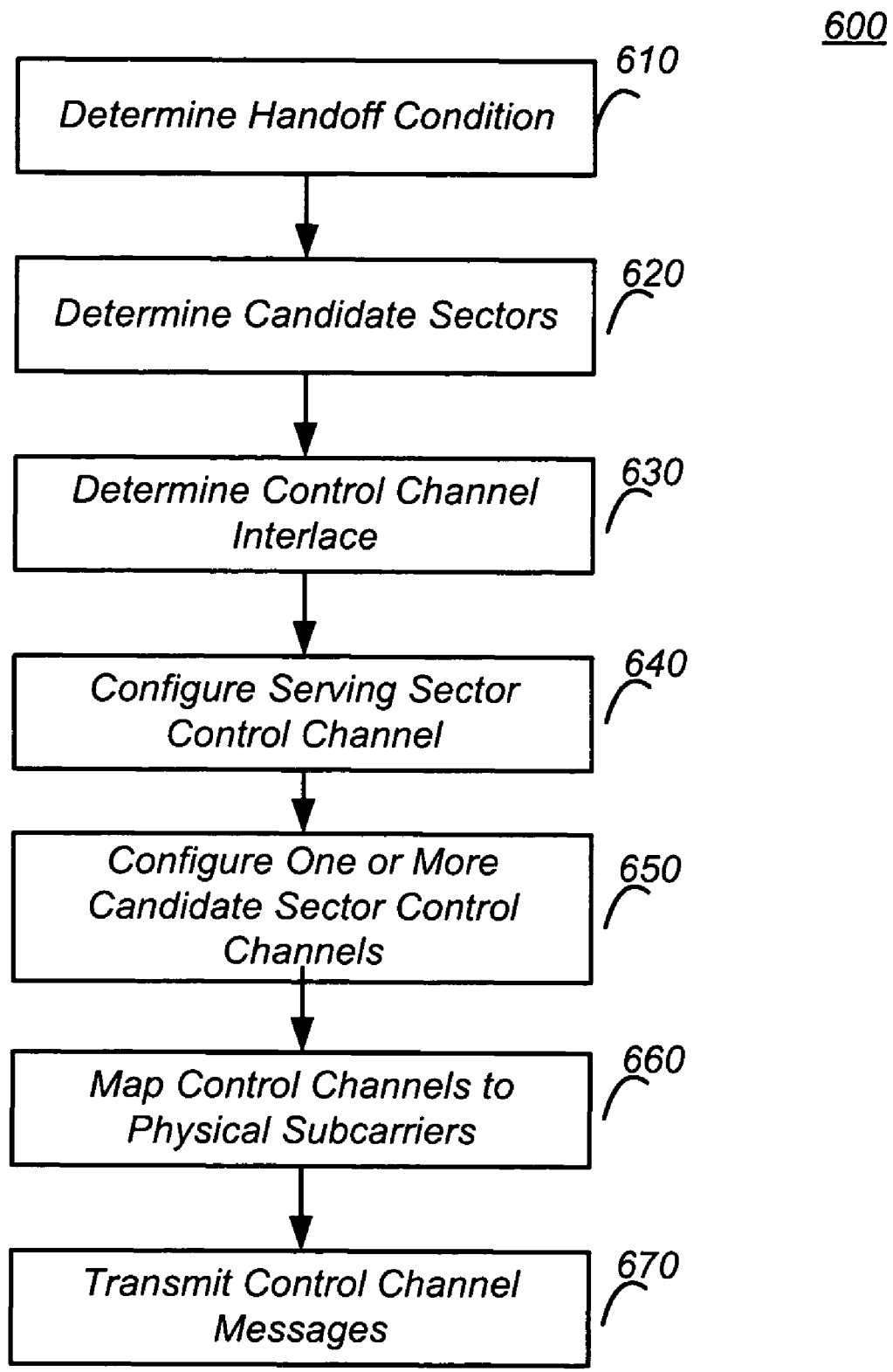
FIG. 6 is a simplified flowchart of an embodiment of a method of control channel interlacing.

FIG. 6 is a simplified flowchart of an embodiment of a method 600 of control channel interlacing. The method 600 can be performed by the receiver system of FIG. 2 or the interlace controller of FIG. 3.

The method 600 begins at block 610, where the receiver system determines that the access terminal is operating in a handoff condition. Such as condition can occur as a result of a diminished CQI for the serving sector in combination with the availability of one or more candidate sectors. The access terminal can request a control channel from each of the candidate sectors.

The receiver system proceeds to block 620 to determine the number of candidate sectors. The receiver system can determine the number of candidate sectors, for example, based on one or more flags or indicators. The receiver system proceeds to block 630 and determines the control channel interlace timing and which control channel interlace is active or otherwise is presently being processed.

The receiver system proceeds to block 640 and directs the serving sector control module to selectively configure the control channel message of for the serving sector based in part on the identity of the active control channel interlace. For example, the receiver system may not direct the serving sector control module to configure a control message to the serving sector if the receiver system determines that the control channel interlace process determines no serving sector control message is to be generated for the active control channel interlace.

The receiver system proceeds to block 650 and selectively directs the non-serving sector control module to configure one or more control messages corresponding to the one or more non-serving sector control channels. The receiver system determines which of the control messages to configure, and thus, which of the non-serving sectors to communicate with, based at least in part on the control channel interlace and the identity of the control channel associated with the control channel interlace. In some embodiments, the receiver system can also determine the data channel interlace and can selectively puncture the control message based on the data channel interlace.

The receiver system proceeds to block 660 and directs the signal mapper to map the control channel logical channels to the physical channels of an OFDM symbol. The logical to physical mapping can be performed according to a predetermined frequency hopping algorithm, pattern, or sequence. The receiver system proceeds to block 670 and transmits the OFDM symbol having the proper control channel message contained therein.

Figure 7:
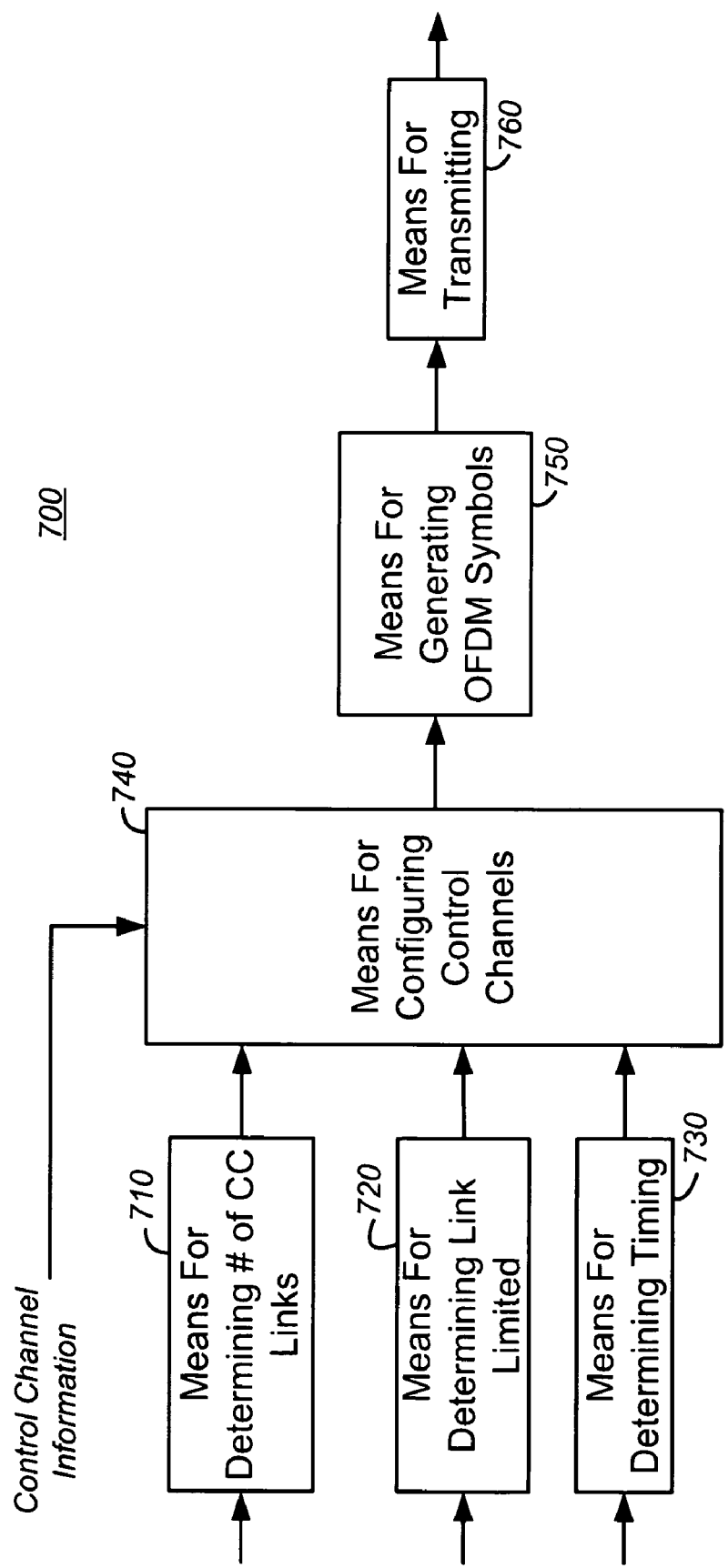
FIG. 7 is a simplified functional block diagram of an embodiment of a transmitter implementing control channel interlacing.

FIG. 7 is a simplified functional block diagram of an embodiment of a transmitter 700 implementing control channel interlacing. The transmitter 700 includes means for determining a number of control channels 710 assigned to the transmitter 700, and can determine the number of control channel links that need to be serviced. The means for determining a number of control channels 710 can include means for determining one or more non-serving sector control channels and can determine the number of non-serving sector control channels. The transmitter 700 also includes a means for determining a link limited data link 720 that can include a means for determining if the transmitter 700 is in a handoff.

The transmitter 700 also includes a means for determining timing 730 that can include means for determining control channel interlace timing as well as means for determining data interlace timing. The means for determining timing 730 can also include means for determining OFDM symbol timing, and the symbol timing can include slot timing or frame timing.

Each of the functional blocks of the transmitter 700 described above is coupled to a means for configuring a control channel message 740. The means for configuring the control channel message 740 can selectively configure one or more control channel messages corresponding to one or more of the assigned control channels based in part on the timing, number of control channels, and presence of a link limited data channel. The means for configuring the control channel message 740 can include means for interlacing the plurality of control channels.

The output of the means for configuring a control channel message 740 is coupled to a means for generating an OFDM symbol 750. The means for generating an OFDM symbol 750 can operate to perform an IFFT of a plurality of OFDM subcarriers to generate a plurality of OFDM symbol samples.

The means for generating an OFDM symbol 750 couples the plurality of OFDM symbol samples to a means for transmitting the OFDM symbols 760. The means for transmitting the OFDM symbols 760 can be configured to process and frequency convert the OFDM samples to a RF channel, over which the OFDM symbol is transmitted.

Apparatus and methods are described herein to interlace control channel messages corresponding to a plurality of control channel assignments. Each control channel assignment can occur within a subset of subcarriers of an OFDM system. The control channel messages are interlaced across one or more control channel interlaces supported by the wireless system.

Any of a plurality of interlace processes can be implemented to allow for interlacing of the various control channels and underlying control channel messages. The control channels of the non-serving sectors can be multiplexed in around robin fashion, can be grouped within one or more interlaces, or can be assigned to distinct interlaces, for example. An interlace controller can track an assigned data interlace and can selectively puncture the control channel messages corresponding to non-serving sector control channels, if the control channel interlace coincides with a data interlace.

The apparatus and methods enable a transmitter to support a plurality of control channel assignments without substantially degrading the performance of a link limited data channel. The control channel interlacing reduces the amount of power allocated to the control channels to optimize the power that can be allocated to the data channel.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of configuring communications over a plurality of control channels assigned to a wireless device, the method comprising:
    determining a data channel interlace and a plurality of control channel interlaces;
    assigning control channel communications for the plurality of control channels over the plurality of control channel interlaces; and
    selectively puncturing at least a portion of the control channel communications based on the data channel interlace.

2. The method of claim 1, wherein determining the plurality of control channel interlaces comprises:

determining a number of distinct control channels assigned to the wireless device; and configuring a control channel interlace for each of the number of distinct control channels assigned to the wireless device.

3. The method of claim 1, wherein determining the plurality of control channel interlaces comprises:

determining a number of distinct control channels of the plurality of control channels; and assigning a distinct control channel interlace to each of the plurality of control channels.

4. The method of claim 1, wherein determining the plurality of control channel interlaces comprises determining a predetermined number of control channel interlaces.

5. The method of claim 1, wherein assigning control channel communications comprises:

assigning a first control channel interlace for serving sector control channel communication; and assigning a second control channel interlace distinct from the first control channel interlace for control channel communication with at least one non-serving sector.

6. The method of claim 5, further comprising:

puncturing information in the second control channel interlace when the second control channel interlace is concurrent with the data channel interlace.

7. The method of claim 1, wherein assigning control channel communications comprises configuring a control message for a distinct one of the control channels based on the control channel interlace.

8. The method of claim 1, wherein assigning control channel communications comprises:

determining an active control channel interlace from the plurality of control channel interlaces;

configuring a logical control channel corresponding to the active control channel interlace; and mapping the logical control channel to a subset of subcarriers of an Orthogonal Frequency Division Multiplex (OFDM) symbol.

9. The method of claim 8, wherein mapping the logical control channel to the subset of subcarriers comprises mapping the logical control channel to the subset of subcarriers according to a frequency hopping algorithm.

10. A method of configuring communications over a plurality of control channels assigned to a wireless device, the method comprising:

determining a handoff condition;

determining a control channel assignment of a serving sector;

determining at least one control channel assignment of a non-serving sector;

determining a data channel interlace and a control channel interlace;

selectively configuring a control message for one of the control channel assignment of the serving sector or the at least one control channel assignment of the non-serving sector; and selectively puncturing the control message based on the data channel interlace.

11. The method of claim 10, further comprising mapping the control message to a plurality of subcarriers in at least one Orthogonal Frequency Division Multiplex (OFDM) symbol.

12. The method of claim 10, wherein determining the control channel interlace comprises:

determining a first control channel interlace corresponding to the control channel assignment of the serving sector; and determining at least one additional control channel interlace corresponding to the at least one control channel assignment of the non-serving sector.

13. The method of claim 10, wherein selectively puncturing the control message comprises:

puncturing the control message if the data interlace overlaps at least a portion of the control channel interlace, and if the control message is configured for the at least one control channel assignment of the non-serving sector.

14. An apparatus configured to communicate over a plurality of assigned control channels, the apparatus comprising:

a serving sector control module configured to selectively configure a first control message for communication over a logical control channel corresponding to a serving sector;

a non-serving sector control module configured to selectively configure a second control message for communication over a logical control channel corresponding to a non-serving sector; and an interlace controller configured to determine a data channel interlace and a control channel interlace and activate one of the serving sector control module or non-serving sector control module based on the data channel interlace and the control channel interlace and selectively puncture control messages corresponding to the non-serving sector control module based on the data channel interlace.

15. The apparatus of claim 14, wherein the interlace controller is configured to activate the serving sector control module during a first control channel interlace and activate the non-serving sector control module during a second control channel interlace.

16. The apparatus of claim 14, wherein the interlace controller is configured to allocate a distinct control channel interlace to a serving sector control channel assignment and each of at least one non-serving sector control channel assignment.

17. The apparatus of claim 14, wherein the non-serving sector control module is configured to interlace control messages to each of a plurality of non-serving sectors.

18. The apparatus of claim 14, wherein the non-serving sector control module is configured to concurrently configure a plurality of control messages corresponding to each of a plurality of non-serving sector control channels.

19. The apparatus of claim 14, further comprising:

a control channel mapper coupled to the serving sector control module and the non-serving sector control module and configured to map each of the logical control channel corresponding to the serving sector and the logical control channel corresponding to the non-serving sector to subcarriers of an OFDM symbol according to a logical channel to subcarrier map.

20. The apparatus of claim 19, further comprising a hop assignment module coupled to the control channel mapper and configured to generate the logical control channel to subcarrier map according to a frequency hopping algorithm.

21. An apparatus configured to communicate over a plurality of assigned control channels, the apparatus comprising:

means for determining a number of control channel assignments corresponding to a plurality of control channels;

means for determining data channel interlace and control channel interlace timing; and means for configuring at least one control channel message corresponding to one or more of the control channel assignments based on the data channel interlace and the control channel interlace timing and the number of control channel assignments and selectively puncturing at least a portion of the control channel messages based on the data channel interlace.

22. The method of claim 21, wherein the means for determining the number of control channel assignments comprises means for determining a number of non-serving sector control channels.

23. The method of claim 21, wherein the means for configuring at least one control channel message comprises means for interlacing the plurality of control channels over at least one control channel interlace.

24. A non-transitory computer-readable medium encoded with a computer program to perform the steps comprising:
- determining a data channel interlace and a plurality of control channel interlaces;
- interlacing communications to each of the plurality of control channels over the plurality of control channel interlaces; and
- selectively puncturing at least a portion of the communications based on the data channel interlace.

25. A non-transitory computer-readable medium encoded with a computer program to perform the steps comprising:
- determining a handoff condition;
- determining a control channel assignment of a serving sector;
- determining at least one control channel assignment of a non-serving sector;
- determining a data channel interlace and a control channel interlace;
- selectively configuring a control message for one of the control channel assignment of the serving sector or the at least one control channel assignment of the non-serving sector; and
- selectively puncturing the control message based on the data channel interlace.

* * * * *